Patented Oct. 14, 1947

2,428,787

UNITED STATES PATENT OFFICE 2,428,787

INTERPOLYMERIZATION PRODUCTS

Gaetano F. D'Alelio, Pittsfield, Mass., assignor to General Electric Company, a corporation of New York No Drawing. Application October 31, 1939, Serial No. 302,168

13 Claims. (Cl. 260—42)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one polymerizable modified or unmodified polyhydric alcohol ester of an alpha unsaturated alpha beta polycarboxylic acid (hereafter for brevity designated generally as an "unsaturated alkyd resin") with at least one polymerizable polyester obtained by esterifying a non-ethylenic polycarboxylic acid, e. g., a saturated aliphatic polycarboxylic acid such as succinic acid, with an unsaturated monohydric alcohol, e. g., allyl alcohol.

The polyesters of unsaturated monohydric alcohols used in carrying the present invention into effect may be considered as being members of the class of esters which may be represented by the formula

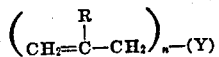

where R is a member of the class consisting of hydrogen, unsubstituted hydrocarbon radicals and substituted hydrocarbon radicals, for instance hydrocarbon radicals containing substituent groups such as halogeno, carboxy, carbalkoxy, acyloxy, alkoxy, aryloxy, nitro, acyl, nitrilo, aldehydo, etc.; $n$ has a numerical value of at least two; and Y represents the radical of a non-ethylenic polycarboxylic acid (or an anhydride thereof, if available) containing at least two carboxy groups. Thus, R may be for example, any alkyl radical such as methyl, ethyl, propyl, isopropyl, butyl, secondary butyl, isobutyl, amyl, isoamyl, hexyl, octyl, etc., any carbocyclic radical such as phenyl, cresyl, halophenyl, xylyl, tolyl, naphthyl, phenoxy ethyl, phenyl propyl, cyclohexyl, orthomethyl cyclohexyl, etc. Examples of Y are the radicals of saturated aliphatic polycarboxylic acids such as oxalic, malonic, succinic, adipic, glutaric, pimelic, sebacic, azelaic, suberic, tricarballylic, tartaric, citric, etc., the radicals of the cyclic polycarboxylic acids, specifically the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids, e. g. phthalic, isophthalic, terephthalic, benzoyl phthalic, diphenic and benzophenone-2,4' dicarboxylic acids, etc. Tartaric and citric acids are examples of hydroxy saturated polycarboxylic acids.

A very practical advantage accruing from my invention is that it provides new compositions adapted for the production of cast or molded massive bodies. The unsaturated alkyd resins alone are unsuited, even in the presence of polymerization catalysts such as peroxides, for the preparation of practically useful massive bodies. With or without polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment even for 24 hours in the presence of a polymerization catalyst such as super-peroxides usually gives unsuitable materials, that is, they generally lack the properties required for the usual service applications. For example, the cast or molded articles often are soft, rubbery masses (even after heat treatment for 24 hours at elevated temperatures) or, if hard bodies, frequently are filled with bubbles or show cracks, or both, when cured. I have discovered that these and other difficulties in the production of useful, massive, cast or molded articles from unsaturated alkyd resins can be obviated by forming copolymers of such resins with polyallyl esters of non-ethylenic polycarboxylic acids. This was quite surprising and unexpected, as these polyallyl esters when polymerized alone usually are gel-like, friable compositions of very limited applications. There are no difficulties in incorporating a catalyst into the mixed or dissolved components, as usually is the case when effort is made to polymerize an unsaturated alkyd resin alone, since these polyallyl esters are good dispersion mediums for the usual polymerization catalysts. The copolymerization between the components proceeds satisfactorily, yielding interpolymerization products having properties quite different from the properties of the individual components when polymerized under the same conditions and different from mechanical admixtures of the separately polymerized components.

Compositions produced in accordance with this invention are also particularly well adapted for use as "solventless varnishes," for instance, as coating compositions and binders in the production of laminated sheets and tapes for use in insulating electrical devices, as well as for other applications.

In carrying the present invention into effect a polymerizable esterification product of a polyhydric alcohol and an alpha unsaturated alpha beta polycarboxylic acid is first prepared in accordance with technique now well known to those skilled in the alkyd resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, thiodiglycol, glycerine, pentaerythrito, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric. monohalofumaric, citraconic, mesaconic, acetylene dicarboxylic, aconitic, itaconic and its homologues as for instance alpha methyl itaconic acid, alpha ethyl itaconic acid, alpha alpha dimethyl itaconic acid, etc. If available, anhydrides of these polycarboxylic acids may be employed.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, e. g., a saturated aliphatic polycarboxylic acid such as succinic, adipic, glutaric, pimelic, sebacic, azelaic, suberic. tricarballylic, tartaric. citric, etc., cyclic polycarboxylic acids, more specifically the saturated cycloaliphatic, polycarboxylic acids such as the cyclopropane dicarboxylic acids, the cyclohexane dicarboxylic acids, the alkyl cycloalkane polycarboxylic acids, etc., and the aromatic polycarboxylic acids, e. g., phthalic, benzoyl phthalic, terephthalic, isophthalic, benzophenone-2,4' dicarboxylic, etc., or with anhydrides of such acids if available.

The term "unsaturated alkyd resin" as used generally herein and in the appended claims is intended to include within its meaning both unmodified esterification products of a polyhydric alcohol with an alpha unsaturated alpha beta polycarboxylic acid and polymerizable esterification products of the said components which have been modified, for example, as above briefly described. The terms "polycarboxylic acid" and "dicarboxylic acid," as used generally herein and in the appended claims with reference to nonethylenic polycarboxylic acids and alpha unsaturated alpha beta polycarboxylic acids, are intended to include within their meanings the anhydrides of such acids.

To achieve copolymerization of the unsaturated alkyd resin with the polyallyl ester, a solution of the said resin in the said ester first preferably is effected. The polyallyl ester also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g. acetyl peroxide, lauryl peroxide, stearyl peroxide, etc., peroxides of the aromatic acid series, e. g. benzoyl peroxide, various per-compounds such as perborates, persulfates, perchlorates, etc., aluminum salts such as the halides, e. g., aluminum chloride, etc., organic and inorganic acids such as methacrylic acid, hydrofluoric acid, etc., metal compounds of the unsaturated acids as for instance cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the polyallyl ester and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight. Reference is first made to the components, and proportions thereof, used in the preparation of the unsaturated alkyd resin. These resins (identified by letter designations) were copolymerized with various polyally esters in varying amounts, using 1% by weight of the mixed components of benzoyl peroxide as an accelerator of polymerization. A brief description of the properties of the copolymer after 24 hours' interpolymerization at 70° C. is given.

*Example 1*

| Unsaturated Alkyd Resin | Composition |
| --- | --- |
| A | ethylene glycol (23 parts) and itaconic acid (52 parts). |
| B | diethylene glycol (106 parts) and itaconic acid (130 parts). |
| C | glycerine (18.4 parts) and itaconic acid (26 parts). |
| E | ethylene glycol (62.05 parts) itaconic acid (32.51 parts) and phthalic anhydride (111.03 parts). |
| F | glycerine (20 parts) itaconic acid (29 parts) and phthalic anhydride (11 parts). |
| G | diethylene glycol (20 parts) itaconic acid (18.2 parts) and succinic acid (7.08 parts). |
| H | ethylene glycol (20 parts) maleic anhydride (29.4 parts) and succinic acid (3.3 parts). |
| I | diethylene glycol (30.6 parts) maleic anhydride 17.6 parts) and itaconic acid (15.6 parts). |
| K | glycerine (18.4 parts) and maleic anhydride (29.4 parts). |
| L | diethylene glycol (30.3 parts) maleic anhydride (13.2 parts) and phthalic anhydride (21.7 parts). |
| M | glycerine (25.76 parts) maleic anhydride (13.72 parts) and phthalic anhydride (20.72 parts). |
| N | ethylene glycol (18 parts) and maleic anhydride (27.4 parts). |
| O | diethylene glycol (160 parts) and maleic anhydride (147 parts). |

A copolymer of ethylene glycol itaconate and diallyl oxalate was made by dissolving 90 parts of resin A in 10 parts diallyl oxalate containing 1 part benzoyl peroxide in solution. The solution of these components was subjected to a temperature of about 70° C. and in about 30 minutes a hard, insoluble, infusible copolymer had formed. There were no visual indications of further interpolymerization between the components after heating for an additional 12 hours.

In a similar manner the following other copolymers were made:

| Resin | Parts | Polyallyl Ester | Parts | Characteristics of Copolymer after 24 Hours at 70° C. |
|---|---|---|---|---|
| A | 90 | diallyl succinate | 10 | hard, clear. |
| A | 10 | ---do--- | 90 | soft, opaque. |
| B | 90 | diallyl oxalate | 10 | soft, clear. |
| B | 90 | diallyl succinate | 10 | hard, clear. |
| B | 10 | diallyl oxalate | 90 | soft, clear, gel-like. |
| B | 10 | diallyl succinate | 90 | Do. |
| C | 90 | diallyl oxalate | 10 | hard, clear. |
| C | 10 | ---do--- | 90 | soft, translucent. |
| C | 10 | diallyl succinate | 90 | Do. |
| E | 90 | diallyl oxalate | 10 | hard, clear. |
| F | 90 | ---do--- | 10 | Do. |
| G | 90 | ---do--- | 10 | firm, clear. |
| G | 10 | ---do--- | 90 | soft, clear. |
| H | 90 | ---do--- | 10 | hard, clear. |
| H | 90 | diallyl succinate | 10 | Do. |
| I | 90 | diallyl oxalate | 10 | soft, clear. |
| I | 90 | diallyl succinate | 10 | hard, clear. |
| K | 90 | diallyl oxalate | 10 | hard, white, opaque. |
| K | 90 | diallyl succinate | 10 | Do. |
| L | 90 | diallyl oxalate | 10 | clear, hard. |
| L | 90 | diallyl succinate | 10 | Do. |
| M | 80 | ---do--- | 20 | fairly soft. |
| N | 80 | diallyl oxalate | 20 | clear, hard. |
| N | 80 | diallyl succinate | 20 | Do. |
| O | 80 | diallyl oxalate | 20 | Do. |
| O | 80 | diallyl succinate | 20 | Do. |

*Example 2*

Compositions were prepared by mixing 90 parts ethylene glycol maleate, specifically resin N described under Example 1, with 10 parts of the following polyallyl esters in which was incorporated prior to admixture 1 part benzoyl peroxide: diallyl malonate, diallyl-2-allyl malonate, diallyl, adipate, diallyl glutarate, diallyl azelate and diallyl tartrate. Small samples of the resulting solutions were heated on a 130° C. hot plate, and all were converted into hard, insoluble and infusible films in less than 60 seconds.

*Example 3*

In a manner similar to that described under Example 2, and using substantially the same ratios of components, diamethallyl succinate was copolymerized with resins A, B, C, E, F, G, H, I, K, L, M, N and O, yielding insoluble and infusible films in each case.

It will be understood, of course, that my invention is not limited to the production of copolymers of the particular unsaturated alkyd resins with the particular polyallyl esters of non-ethylenic polycarboxylic acids set forth in the above examples and that unsaturated alkyd resins and polyallyl esters of non-ethylenic polycarboxylic acids other than those above given by way of illustration may be employed in producing the new interpolymerization products of this invention. Also, polymerization catalysts other than benzoyl peroxide may be employed, for instance accelerators of polymerization such as hereinbefore mentioned.

In certain cases, instead of copolymerizing a single polyallyl ester with a single unsaturated alkyd resin, I may copolymerize a plurality of polyallyl esters of non-ethylenic polycarboxylic acids with a single unsaturated alkyd resin or with a plurality of such resins. In this way it is possible to obtain a composition comprising a mixture of interpolymers best adapted to meet a particular service application.

Although in the foregoing examples I have shown the production of interpolymers by copolymerizing the starting component within the range of, by weight, 10 to 90 per cent of the unsaturated alkyd resin to 90 to 10 per cent of the polyallyl ester, it will be understood, of course, that the invention is not limited to these particular ranges of proportions. The incorporation of a small amount, e. g., 3 or 4 per cent, of these polyallyl esters into an unsaturated alkyd resin has a beneficial effect upon such resins, yielding products of improved properties as compared with an unsaturated alkyd resin which has been polymerized in the absence of such an ester. However, somewhat better results usually are obtained when the polyallyl ester constitutes, say, 6 or 8 per cent by weight of the mixed starting components. In most cases the mixed components are so proportioned that the polyallyl ester constitutes from 10 to 90 per cent by weight of the whole, but the use of higher amounts is not precluded. Thus, in the production of organic plastic masses where the hardness of the composition is of secondary consideration, the polyallyl ester may constitute, say, 94 or 95%, or more, by weight of the whole, depending, for example, upon the particular starting components employed and the particular properties desired in the copolymer.

The interpolymerization products of this invention have a wide range of properties. Depending, for instance, upon the particular unsaturated alkyd resin and the particular polyallyl ester of a non-ethylenic polycarboxylic acid employed, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization some of the herein described polymerizable mixtures form fluid compositions of varying intrinsic viscosities and may be so used. For coating or impregnating applications where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new compositions may be used alone or with fillers, dyes, pigments, lubricants, opacifiers, plasticizers, or other modifying agents in, for example, casting, molding and laminating applications, as adhesives, impregnants and surface coating materials. In coating, impregnating and similar applications the mixed components, without added solvent, may be applied to the object to be treated and polymerized as hereinbefore described, with or without the application of pressure, to form the copolymer in situ. They may be used as impregnants for many porous bodies, such as cork, pottery, felts, or fabricated bodies with interstices, such as the windings of electrical coils, netted fibers, interwoven fibrous materials. They also may be used for protectively coating impervious articles such as metals, e. g., iron or copper wire, or for coating or coating and impregnating articles such as paper, wood, cloth, glass fibers, in felted, woven or other form, linoleum, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield numerous molded articles of manufacture for industrial, household and novelty uses.

What I claim as new and desire to secure by Letters Patent of the United States, is:

1. The product of polymerization of a mixture of compatible, copolymerizable materials consisting of (1) a polymerizable unsaturated alkyd resin obtained by esterification of a polyhydric alcohol, an alpha unsaturated alpha beta polycarboxylic acid and a polycarboxylic acid selected from the class consisting of saturated aliphatic polycarboxylic acids and aromatic polycarboxylic acids, and (2) a polyallyl ester of a saturated aliphatic polycarboxylic acid.

2. The product of polymerization of a mixture of compatible, copolymerizable materials consisting of an itaconic ester of a polyhydric alcohol and a polyallyl ester of a saturated aliphatic polycarboxylic acid.

3. The product of polymerization of a mixture of compatible, copolymerizable materials comprising (1) a polymerizable unsaturated alkyd resin obtained by esterification of a dihydric alcohol, an alpha unsaturated alpha beta dicarboxylic acid and a saturated aliphatic dicarboxylic acid, and (2) a polyallyl ester of a saturated aliphatic polycarboxylic acid.

4. The product of polymerization of a mixture of compatible, copolymerizable materials comprising (1) a polymerizable unsaturated alkyd resin obtained by esterification of a dihydric alcohol, an alpha unsaturated alpha beta dicarboxylic acid, and an aromatic dicarboxylic acid, and (2) a polyallyl ester of a saturated aliphatic polycarboxylic acid.

5. The product of polymerization of a mixture of compatible, copolymerizable materials comprising (1) a polymerizable unsaturated alkyd resin obtained by esterification of a polyhydric alcohol, an alpha unsaturated alpha beta polycarboxylic acid and a polycarboxylic acid selected from the class consisting of saturated aliphatic polycarboxylic acids and aromatic polycarboxylic acids, and (2) a diallyl ester of a saturated aliphatic dicarboxylic acid.

6. A composition comprising the product of polymerization of a mixture of compatible, copolymerizable materials comprising an itaconic ester of a dihydric alcohol and a polyallyl ester of a saturated aliphatic polycarboxylic acid.

7. A composition comprising the product of polymerization of a mixture of compatible, copolymerizable materials comprising (1) a polymerizable unsaturated alkyd resin obtained by esterification of ethylene glycol, maleic anhydride, and succinic acid, and (2) diallyl oxalate.

8. A composition comprising the product of polymerization of a mixture of compatible, copolymerizable materials comprising (1) a polymerizable unsaturated alkyd resin obtained by esterification of glycerine, maleic anhydride, and phthalic anhydride, and (2) diallyl succinate.

9. A composition comprising the product of polymerization of a mixture of compatible, copolymerizable materials comprising ethylene glycol itaconate and diallyl succinate.

10. The method of producing new synthetic compositions which comprises polymerizing a mixture of compatible, copolymerizable materials comprising (1) a polymerizable unsaturated alkyd resin obtained by the esterification of a polyhydric alcohol, an alpha unsaturated alpha beta polycarboxylic acid and a polycarboxylic acid selected from the class consisting of saturated aliphatic polycarboxylic acids and aromatic polycarboxylic acids, (2) a polyallyl ester of a saturated aliphatic polycarboxylic acid, and (3) a catalyst for accelerating the copolymerization of (1) and (2).

11. The method of producing new synthetic compositions which comprises polymerizing a mixture of compatible, copolymerizable materials comprising (1) an itaconic ester of a polyhydric alcohol, (2) a polyallyl ester of a saturated aliphatic polycarboxylic acid, and (3) a catalyst for accelerating the copolymerization of (1) and (2).

12. The method of producing new synthetic compositions which comprises polymerizing a mixture comprising (1) a polymerizable unsaturated alkyd resin obtained by esterification of diethylene glycol, maleic anhydride, and phthalic anhydride, (2) diallyl succinate, and (3) a catalyst for accelerating the copolymerization of (1) and (2).

13. The method of producing new synthetic compositions which comprises polymerizing a mixture comprising (1) ethylene glycol itaconate, (2) diallyl succinate, and (3) a catalyst for accelerating the copolymerization of (1) and (2).

GAETANO F. D'ALELIO.

REFERENCES CITED

The following references are of record in the file of this patent:

UNITED STATES PATENTS

| Number | Name | Date |
| --- | --- | --- |
| 1,921,756 | Kienle | Aug. 8, 1933 |
| 2,005,414 | Dykstra | June 18, 1935 |
| 2,029,410 | Carothers et al. | Feb. 4, 1936 |
| 2,078,194 | Collins | Apr. 20, 1937 |
| 1,975,959 | Lawson | Oct. 9, 1934 |
| 2,047,398 | Voss et al. | July 14, 1936 |
| 2,195,362 | Ellis | Mar. 26, 1940 |
| 2,218,439 | Rothrock | Oct. 15, 1940 |